US010129704B1

United States Patent
Huseth et al.

(10) Patent No.: US 10,129,704 B1
(45) Date of Patent: Nov. 13, 2018

(54) FIRST RESPONDER TRACKING BREADCRUMBS

(71) Applicant: Honeywell International Inc., Morris Plains, NJ (US)

(72) Inventors: Steve Huseth, Plymouth, MN (US); Neb Petrovacki, Anaheim, CA (US)

(73) Assignee: HONEYWELL INTERNATIONAL INC., A DELAWARE CORPORATION, Morris Plains, NJ (US)

( * ) Notice: Subject to any disclaimer, the term of this patent is extended or adjusted under 35 U.S.C. 154(b) by 0 days.

(21) Appl. No.: 15/634,044

(22) Filed: Jun. 27, 2017

(51) Int. Cl.
*H04W 4/02* (2018.01)
*H04W 4/00* (2018.01)
*H04B 1/38* (2015.01)
*H04W 4/04* (2009.01)

(52) U.S. Cl.
CPC .............. *H04W 4/028* (2013.01); *H04B 1/38* (2013.01); *H04W 4/008* (2013.01); *H04W 4/04* (2013.01)

(58) Field of Classification Search
CPC ...... G01S 19/14; G01S 5/02; H04L 29/08657; H04W 4/02; H04W 64/00
See application file for complete search history.

(56) References Cited

U.S. PATENT DOCUMENTS

| | | | | |
|---|---|---|---|---|
| 5,898,363 A * | 4/1999 | Altilio | ...................... | G08B 3/10 340/286.05 |
| 7,135,967 B2 * | 11/2006 | Culpepper | ............ | G01S 5/0263 340/539.21 |
| 7,598,856 B1 | 10/2009 | Nick et al. | | |
| 9,204,251 B1 | 12/2015 | Mendelson | | |
| 9,257,028 B2 * | 2/2016 | Parkulo | ................ | G08B 25/016 |
| 9,494,674 B2 | 11/2016 | Messier et al. | | |
| 2001/0034223 A1 * | 10/2001 | Rieser | ....................... | G01S 5/02 455/404.2 |
| 2005/0003797 A1 * | 1/2005 | Baldwin | ................ | H04W 4/22 455/404.1 |
| 2008/0077326 A1 * | 3/2008 | Funk | .................... | G01C 21/165 701/500 |
| 2008/0122696 A1 | 5/2008 | Huseth et al. | | |

(Continued)

OTHER PUBLICATIONS

Ungerleider, Neal, "Tracking and Rescuing Firefighters With Disposable "Bread Crumb" Routers", Jun. 23, 2011, pp. 1-5 [retrieved on Apr. 11, 2017] Retrieved from the Internet: <URL:https://www.fastcompany.com/1762656/tracking-and-rescuing-firefighters-disposable-bread-crumb-routers>.

(Continued)

Primary Examiner — Sharad Rampuria
(74) Attorney, Agent, or Firm — Alston & Bird LLP

(57) ABSTRACT

Embodiments relate generally to systems and methods for tracking emergency responders. An emergency responder tracking system may comprise a beacon comprising a radio frequency module; a portable device, wherein the portable device is configured to receive a wireless signal from the beacon and transmit the wireless signal to a computer system, wherein the computer system comprises a user interface and is configured to receive the wireless signal from the portable device and provide a map, in the user interface, of a location of the beacon; wherein the wireless signal comprises a unique identifier, a location of the beacon, a last detected location of an emergency responder, and/or current time.

20 Claims, 6 Drawing Sheets

(56) References Cited

U.S. PATENT DOCUMENTS

2015/0181548 A1* 6/2015 Varoglu ............... H04W 64/00
                                                     455/456.2
2017/0171754 A1* 6/2017 South ................... H04W 12/06
2017/0180929 A1* 6/2017 Cavendish ........... H04W 4/021

OTHER PUBLICATIONS

First Responder Tracking System, iTrack, LLC, 2 pages [retrieved on Jun. 26, 2017], Retrieved from the Internet<URL: http://www.itrack-llc.com/download/pts.pdf>.
European Application Ser. No. 18180184.6, Extended European Search Report and Written Opinion dated Aug. 28, 2018, 8 pages.

* cited by examiner

US 10,129,704 B1

FIRST RESPONDER TRACKING BREADCRUMBS

CROSS-REFERENCE TO RELATED APPLICATIONS

Not Applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The location of people and objects inside an environment, such as, for example, a building may be important. However, the cost of acquiring location data should not be prohibitive. Systems that can send and receive signals, and then process the signals to provide a location can be expensive. Reducing the cost of such systems is desirable.

SUMMARY

In an embodiment, an emergency responder tracking system may comprise a beacon comprising a radio frequency module; a telemetry module, wherein the telemetry module is mounted on a self-contained breathing apparatus and is configured to receive a wireless signal from the beacon and transmit the wireless signal to a computer system, wherein the computer system comprises a user interface and is configured to receive the wireless signal from the telemetry module and provide a map, in the user interface, of a location of the beacon; wherein the wireless signal comprises a unique identifier, a location of the beacon, a last detected location of an emergency responder, and/or current time.

In an embodiment, a method for tracking an emergency responder may comprise attaching a plurality of beacons to a structure within a building, wherein each beacon comprises a radio frequency module; activating each beacon; communicating to a computer system a description of a placement of each beacon relative to surrounding structures; transmitting information from each beacon to a telemetry module, wherein the telemetry module is mounted on a self-contained breathing apparatus of an emergency responder; transmitting the information from the telemetry module to the computer system; drawing a floor plan, with the computer system, of the building based on the description; and displaying in the user interface, the floor plan and location of each beacon; wherein the information comprises a unique identifier, the location of each beacon, a last detected location of the emergency responder, and/or current time.

In an embodiment, a method for directing an emergency responder may comprise attaching a plurality of beacons to a structure within a building, wherein each beacon comprises a radio frequency module; activating each beacon; communicating to a computer system a description of a placement of each beacon relative to surrounding structures; transmitting information from each beacon to a telemetry module, wherein the telemetry module is mounted on a self-contained breathing apparatus of an emergency responder; transmitting the information from the telemetry module to the computer system; drawing a floor plan, with the computer system, of the building based on the description; drawing an exit route for the building, with the computer system based on the description; displaying in the user interface, the floor plan, the exit route, and location of each beacon; and directing an emergency responder to the exit based on signal strength between each beacon and the telemetry module; wherein the information comprises a unique identifier, the location of each beacon, a last detected location of the emergency responder, and/or current time.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
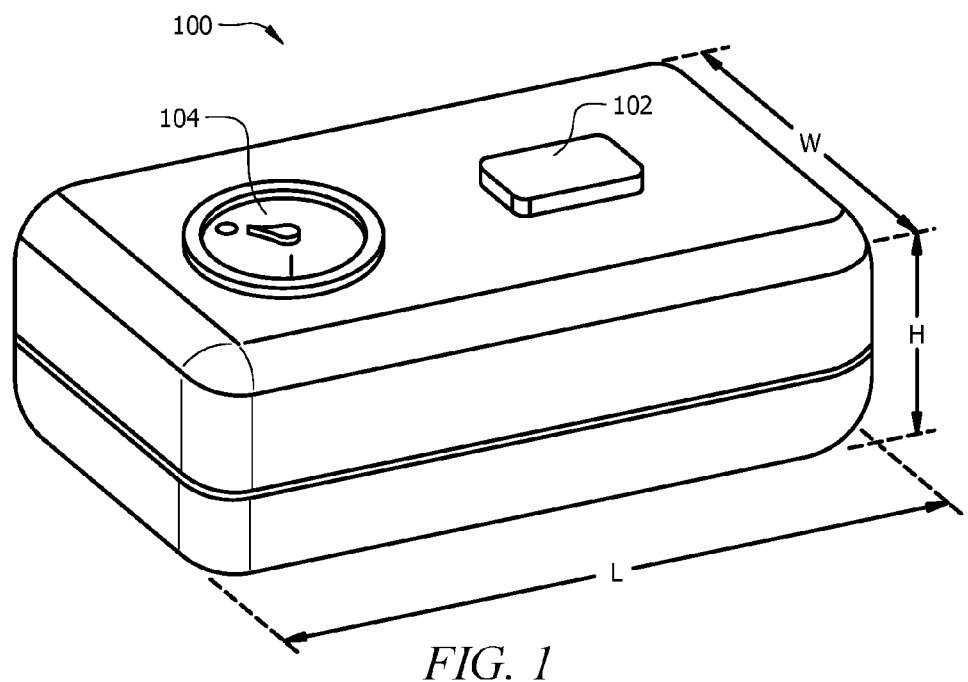
FIG. 1 is a schematic illustration of an RF beacon in accordance with embodiments of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Locating firefighters and emergency workers on the grounds of an active incident has been a key unmet need for some time. Precise location and tracking has been demonstrated to be feasible, but is currently orders of magnitude beyond acceptable cost targets. While some systems such as a Global Positioning System (GPS) could be used, such systems may not work within a closed structure. In addition, such systems often consume large amounts of power from the devices carried by the firefighters and emergency works. Most frequently, incident commanders may need to know the vicinity (e.g., side of the building, floor of the building) of a team member, rather than an exact position.

Embodiments of the disclosure may provide a simple-to-deploy system for identifying key regions and providing automated information on the time and last known position for accountability and directing search and rescue operations. Firefighter or emergency workers may carry portable systems (e.g., a self-contained breathing apparatus ("SCBA")) that can include a low cost, low power radio frequency ("RF") transceiver. These simple, disposable, low cost RF beacons may be provided to key members of a firefighting team, as they enter and move around a structure. At key points inside or outside the structure, the firefighters may take one of the RF beacons, activate the RF beacon (e.g., by turning dial 104, etc.), and mount it to a surrounding structure. Upon activating the RF beacon, the RF beacon may begin transmitting a signal (e.g., wireless) providing its identification and/or location. The RF beacon may have a simple mounting mechanism (e.g., screws, bolts, straps, adhesive, or combinations thereof) to allow mounting of the RF beacon on many internal or external structures, such as, for example, a wall, door, siding, tree, telephone pole, etc. When a firefighter activates and attaches the RF beacon to a surrounding structure, the firefighter may also contact the incident commander and indicate the location of the RF beacon and verify its correct operation. The incident commander may maintain a map containing the locations of all of the RF beacons deployed, or list the location of each of the RF beacons using software integrated to an incident commander (e.g., a computer). Since the signal for the RF beacon may not travel significant distances; when subsequent firefighters pass through the same vicinity, their portable systems may detect the RF beacon and may relay the identification of the RF beacon back to the incident commander. Since the RF signal may travel a short distance, the incident commander can precisely note the place and time the firefighter was at that location associated with the specific RF beacon. Additional uses of the RF beacons may include mounting the RF beacons on rocks or heavy objects that can be thrown into a structure. If the RF beacon is thrown into the vicinity of a lost firefighter, the relay of the RF beacon identification can be used to confirm the firefighter's position.

FIG. 1 is a schematic illustration of an RF beacon 100. The RF beacon 100 may include an RF module 102 configured to communicate via radio frequencies. The RF beacon 100 may also include dial 104 for turning the RF beacon 100 on/off. Dial 104 may also be utilized to set an address (e.g., a unique address) of the location of the RF beacon 100. In certain embodiments, dial 104 may set the address via a color coding scheme (e.g., a specific color for a specific location, set by the factory/manufacturing facility or automatically set by a firefighter's system/equipment). The RF beacon 100 may have a length, L, from about 1.5 inches to about 3 inches; a width, W, from about 1 inch to about 2 inches; and a height, H, from about 0.5 inch to about 1 inch. The RF beacon 100 may be of any suitable shape, such as, for example, a polyhedron (e.g., cube, rectangular prism, a triangular prism). The RF beacon 100 may operate using a battery having a suitable voltage (e.g., a 3 volt battery, etc.) and may be waterproof and/or heat resistant up to about 600° F. The RF beacon 100 may be constructed in a minimally insulated package allowing it to survive for a short time period in a fire situation in order to transmit signals that can be relayed (e.g., through a portable device, etc.) back to an incident commander (e.g., incident commander 112 shown on FIG. 2).

The RF beacon 100 may be a low power radio battery combination that may use one of many wireless protocols, such as, for example, low power protocols such as Low Energy ("BLE"), low power wide area network ("LP-WAN"), 802.15.4, or combinations thereof. Turning dial 104 to an ON position may cause the RF beacon 100 to start transmitting a signal including information, such as, for example, a unique identifier, the RF beacon 100's location (e.g., a regional location, room identifier, site location, etc.), last location a firefighter was detected, and/or current time. This signal may be immediately received by the firefighter's portable device 116 mounted telemetry module (e.g., a SCBA mounted telemetry module shown on FIG. 2, a safety communicator comprising a portable communication device capable of using cellular communication protocols, etc.) and relayed to the incident commander. In some embodiments, data can be transmitted from the portable device to the RF beacon to be stored. For example, a location estimate, or any of the other information listed herein, provided by the portable device can be provided to the RF beacon, which can then be transmitted as part of the RF beacon transmission.

Using a voice radio or other digital means, the user may indicate an area the RF beacon 100 has been mounted in. For example, a notification at the time the RF beacon is deployed can communicate the latest location determination of the portable device, which may be reasonably close to the location of the RF beacon 100 to serve as the location estimate. Subsequent firefighters coming into the same vicinity may detect the RF beacon 100 with their respective portable devices and relay information received from the RF beacon 100 to the incident commander. The transmitted information including the unique identifier, the RF beacon 100's location, a last location a firefighter was detected, and/or current time may be logged by the incident commander.

The RF beacon 100 may be utilized as a location marker. That is, at key points inside or outside a structure (e.g., a building), a user (e.g., an emergency responder such as a firefighter) may take the RF beacon 100, activate the RF beacon 100 by turning dial 104 to an ON position, and attaching/mounting/positioning the RF beacon 100 on a surrounding structure (e.g., wall, floor, ceiling, furniture) within a building. The dial 104 may be graspable by gloved hands (e.g., insulated gloves substantially larger than a human hand, such as firefighter gloves). Upon activating the RF beacon 100, the RF beacon 100 may begin transmitting, a signal including information, such as, for example, a unique identifier, the RF beacon 100's location (e.g., regional location), last location (e.g., regional location) a firefighter was detected, and/or current time. The RF beacon 100 may include a simple mounting mechanism (e.g., screws, bolts, straps, adhesive, or combinations thereof) to allow mounting of RF beacon 100 on many internal and/or external structures, such as, for example, a wall, door, siding, tree, telephone pole, etc. The RF beacon 100 may also be placed/attached to vehicles (e.g., a fire truck) to identify a recovery area, nearness to trucks, etc. The RF beacon 100 may indicate that a user is outside of a structure or inside a structure based on signal strength between the RF beacon 100 and portable device 116. When a firefighter activates and attaches the RF beacon 100 to a structure, the firefighter may also contact an incident commander (e.g., a computer system for monitoring RF beacon(s) 100 and processing information received from RF beacon(s) 100) and provide a description of the location of the RF beacon 100 and verify that the RF beacon 100 is operating correctly. The incident commander may maintain a map containing the locations/positions of the RF beacons 100 deployed, or list the location of each RF beacon 100 by using software integrated to incident commander 112. Since signals from/to the RF beacon 100 may not travel significant distances (e.g., up to about 30 feet), when subsequent firefighters pass through the same vicinity, their portable device 116 may detect the RF beacon 100 and relay information including the unique identifier, the RF beacon 100's location (e.g., regional location), last location (e.g., regional location) a firefighter was detected, and/or current time to incident commander 112. Since the RF signal may travel a short distance, incident commander 112 can precisely or approximately note the place and time each firefighter was at that location. Additional uses of the RF beacons 100 may include mounting the RF beacons 100 on rocks or heavy objects that can be thrown into a structure. If the RF beacon 100 is activated and thrown/deployed into the vicinity of a lost firefighter, confirmation of the firefighter's position can be established. That is, the RF beacon 100 may be thrown into, for example, windows where a lost firefighter is thought to be, and may indicate a presence of the lost firefighter based on signal strength between RF beacon 100 and a portable device 116. Signal strength may indicate whether a firefighter is located at a near distance, a medium distance, or a far distance from the RF beacon 100. The RF beacon 100 may contain a color code wheel numbering system to allow the incident commander to identify the locations of the RF beacon(s) 100.

Figure 2:
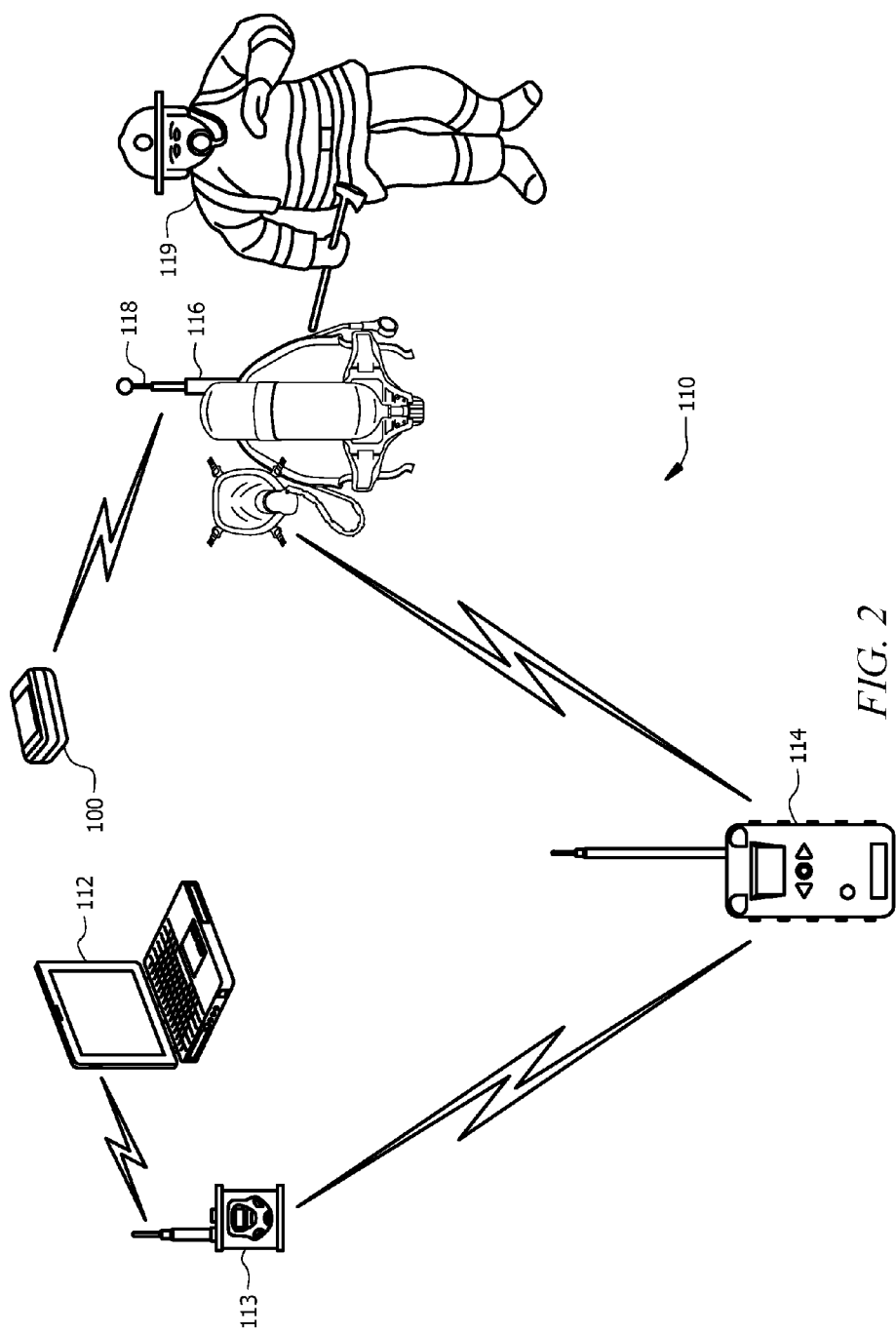
FIG. 2 is a schematic illustration of a breadcrumb telemetry system in accordance with embodiments of the disclosure.

FIG. 2 illustrates a breadcrumb telemetry system 110. Breadcrumb telemetry system 110 may include incident commander 112, an optional RF relay station 114, the RF beacon 100 (breadcrumb), and a portable device 116. A wireless protocol, such as, for example, BLE, low power wide area network ("LPWAN"), 802.15.4, or combinations thereof, may be a communication protocol for communication between RF beacon 100 and portable device 116. A wireless protocol, such as, for example, a long range radio may be a communication protocol for communication among the RF relay station 114, the portable device 116, and the incident commander 112.

The incident commander 112 may include a computer system for monitoring the RF beacon(s) 100 and processing information received from the RF beacon(s) 100 and communication module 113 (e.g., long range radio). The incident commander 112 may be manned or unmanned. The RF relay station 114 may be an optional component of breadcrumb telemetry system 110. The RF relay station(s) 114 may be deployed as needed to increase a communication range between incident commander 112 and the portable device 116. The portable device 116 may include long range (e.g., up to about 20 miles) radio 118, and may relay information (e.g., a unique identifier, the RF beacon 100's location (e.g., regional location), last location (e.g., regional location) a firefighter was detected, and/or current time) it receives from the RF beacon 100 to the RF relay station 114 which may relay the information to incident commander 112. For example, the RF relay station 114 may be a long range radio configured to relay a signal up to about 20 miles. Alternatively, portable device 116 may transmit the information directly to incident commander 112. The portable device 116 may be worn by an emergency responder, such as, for example, firefighter 119.

Figure 3:
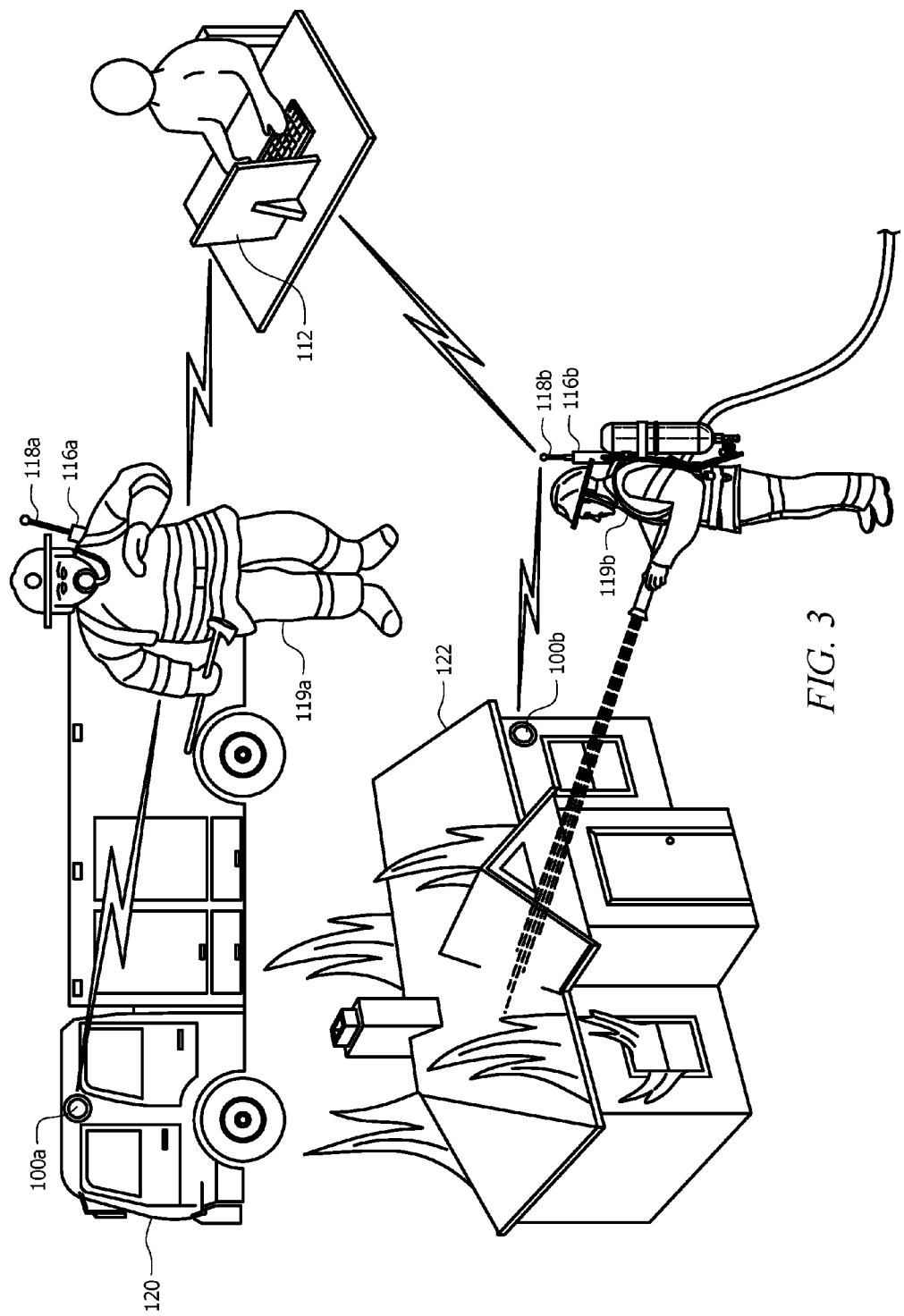
FIG. 3 is a schematic illustration of an RF beacon positioned on an emergency vehicle in accordance with embodiments of the disclosure.

FIG. 3 illustrates an RF beacon 100*a* positioned on an emergency vehicle (e.g., fire truck 120), and an RF beacon 100*b* positioned on structure 122. The RF beacon 100*a* may be activated by firefighter 119*a* and placed on fire truck 120. The firefighter 119*a* may then notify (e.g., via radio, cell phone) the incident commander 112 of the location of the RF beacon 100*a* (e.g., describing that the RF beacon 100*a* is positioned on fire truck 120). The RF beacon 100*a* may transmit information including a unique identifier, RF beacon 100*a*'s location (e.g., regional location), last location (e.g., regional location) firefighter 119*a* was detected, and/or current time, to portable device 116*a* which may relay the information to incident commander 112 via radio 118*a*.

The firefighter 119*b* may activate the RF beacon 100*b* and place it on structure 122. The firefighter 119*b* may then notify (e.g., via radio, cell phone) incident commander 112 of the location of the RF beacon 100*b* (e.g., describing that the RF beacon 100*b* is positioned on structure 122, relaying the firefighter's 119*b* current location, etc.). The RF beacon 100*b* may transmit information including a unique identifier, the RF beacon 100*b*'s location (e.g., regional location), last location (e.g., regional location) firefighter 119*b* was detected, and/or current time, to portable device 116*b* which may relay the information to incident commander 112 via radio 118*b*.

Figure 4:
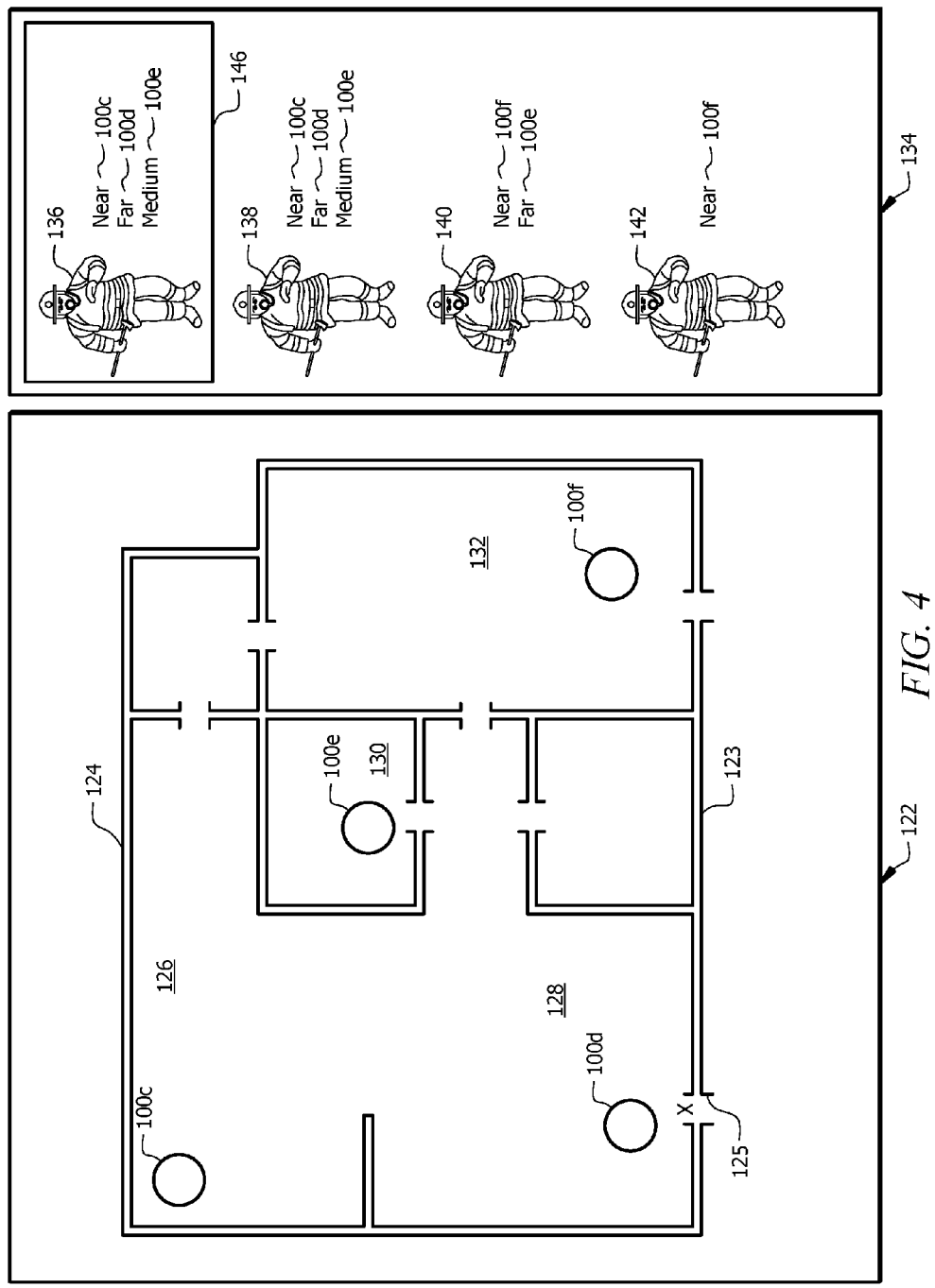
FIG. 4 is a schematic illustration of a user interface in accordance with embodiments of the disclosure.

FIG. 4 illustrates user interface 122 for incident commander 112. The user interface 122 may allow for rapid identification and selection of all of the personnel (e.g., firefighters 136, 138, 140, and 142) in the vicinity, and display annotations (e.g., markers) tracking the movement of the personnel (e.g., emergency responders). The incident commander 112 may draw floor plans 124 of structure 123 using location descriptions provided by a firefighter and/or the information provided by the RF beacons 100*c*-100*f* and display floor plans 124 in user interface 122. The floor plans 124 may include a map of the placement/location of each of the RF beacons 100*c*-100*f*. As illustrated in FIG. 4, a firefighter may enter structure 123 via entrance 125, activate the RF beacons 100*c*-100*f*, and place the RF beacon 100*c* in area 126 (e.g., room, stairwell, or hallway), place 100*d* in area 128, place 100*e* in area 130, and place 100*f* in area 132. The firefighter may then contact the incident commander 112 and describe the regional placement/location of each of the RF beacons 100*c*-100*f* relative to internal structures, such as, for example, stairs, hallways, rooms, closets, doors, entrance 125, exit, structure level (e.g., second floor or first floor), elevators, furniture, etc. The incident commander 112 may then create/draw floor plans 124 based on the regional placement descriptions communicated to incident commander 112 by the firefighter. The panel 134 of the user interface 122 may show each firefighter (e.g., firefighter 136, firefighter 138, firefighter 140, firefighter 142) within structure 123. The panel 134 may also show the signal strength between each of the RF beacons 100c-100f and a portable device 116. The signal strength between the RF beacons 100c-100f and a portable device 116 (shown on FIG. 2) may indicate whether a firefighter (i.e., a firefighter wearing portable device 116) is located at a near distance, a medium distance, or a far distance from each of the RF beacons 100c-100f, as shown in panel 134. The signal strength may be calculated by incident commander 112 with a triangulation algorithm. Specific values for distances may depend upon building materials and/or the layout of structure 123.

Figure 5:
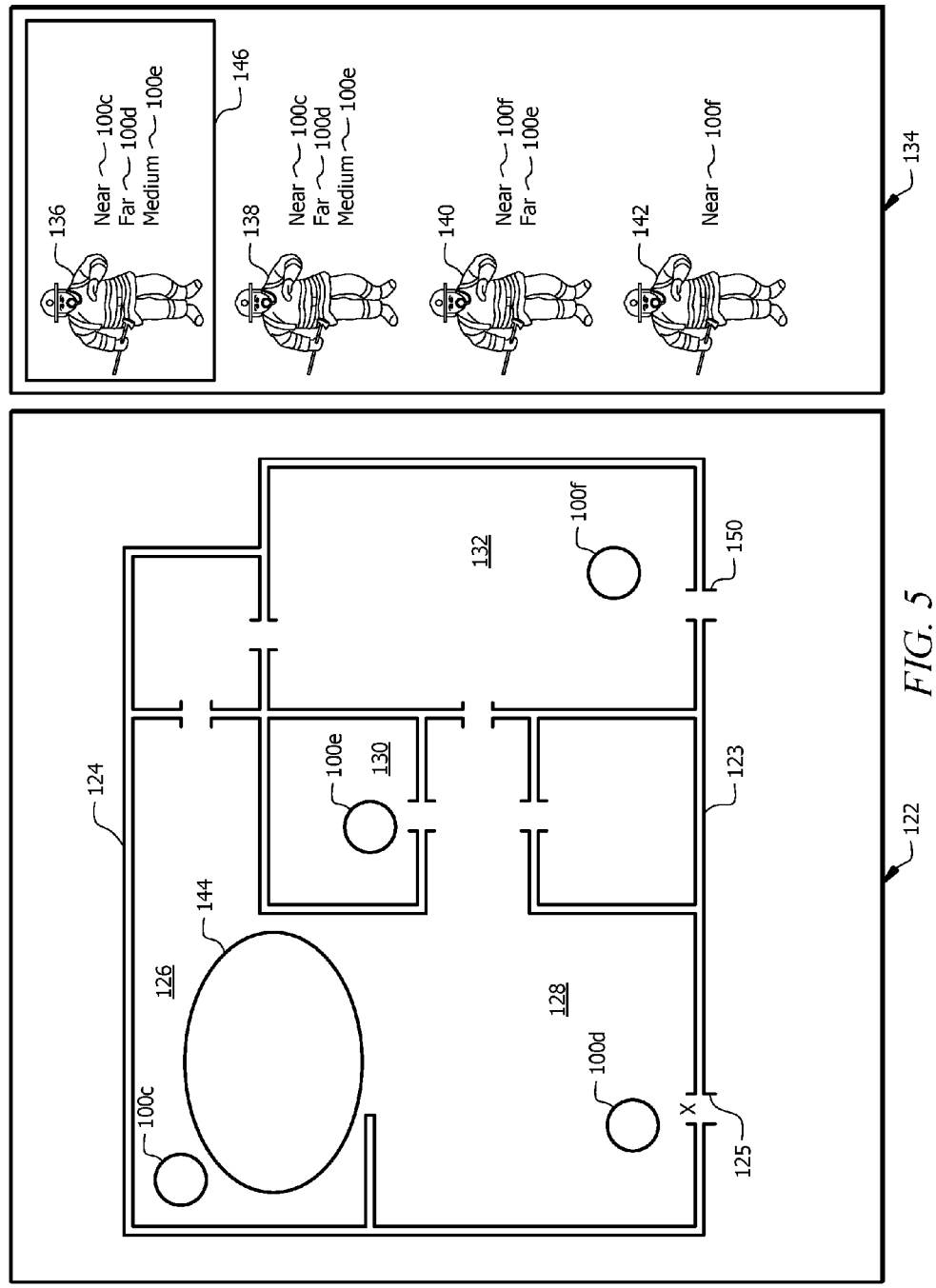
FIG. 5 is a schematic illustration of a user interface showing an estimated region of an emergency responder in accordance with embodiments of the disclosure.

FIG. 5 illustrates user interface 122 showing an estimated region or vicinity 144 of firefighter 136. The user interface 122 may select/highlight (e.g., box 146) a firefighter (e.g., firefighter 136) from a plurality of firefighters (e.g., firefighters 136, 138, 140, and 142) shown in panel 134 when displaying an estimated region (e.g., vicinity 144) for that particular firefighter. The signal strength between the RF beacons 100c-100f and a portable device 116 (shown on FIG. 2) may indicate a vicinity (e.g., vicinity 144) where each firefighter may be located/positioned. The vicinity 144 may be shown with a circular graphic. The vicinity of each firefighter may be calculated by incident commander 112 with a triangulation algorithm. That is, a telemetry module may receive signals from 3 or more RF beacons 100 and may triangulate an estimated region of each firefighter based on signal strength.

During use, the signals detected by the firefighters from the RF beacon(s) can be transmitted back to the incident commander, where the signals can be detected and stored along with various identification information for the firefighters, as well as a time stamp. Upon passing by a plurality of RF beacons, a path can be detected for each firefighter such that the relative locations and timings of the firefighters can be traced. This may allow other firefighters to follow a lead firefighter, or the firefighters' position to be tracked over time.

Figure 6:
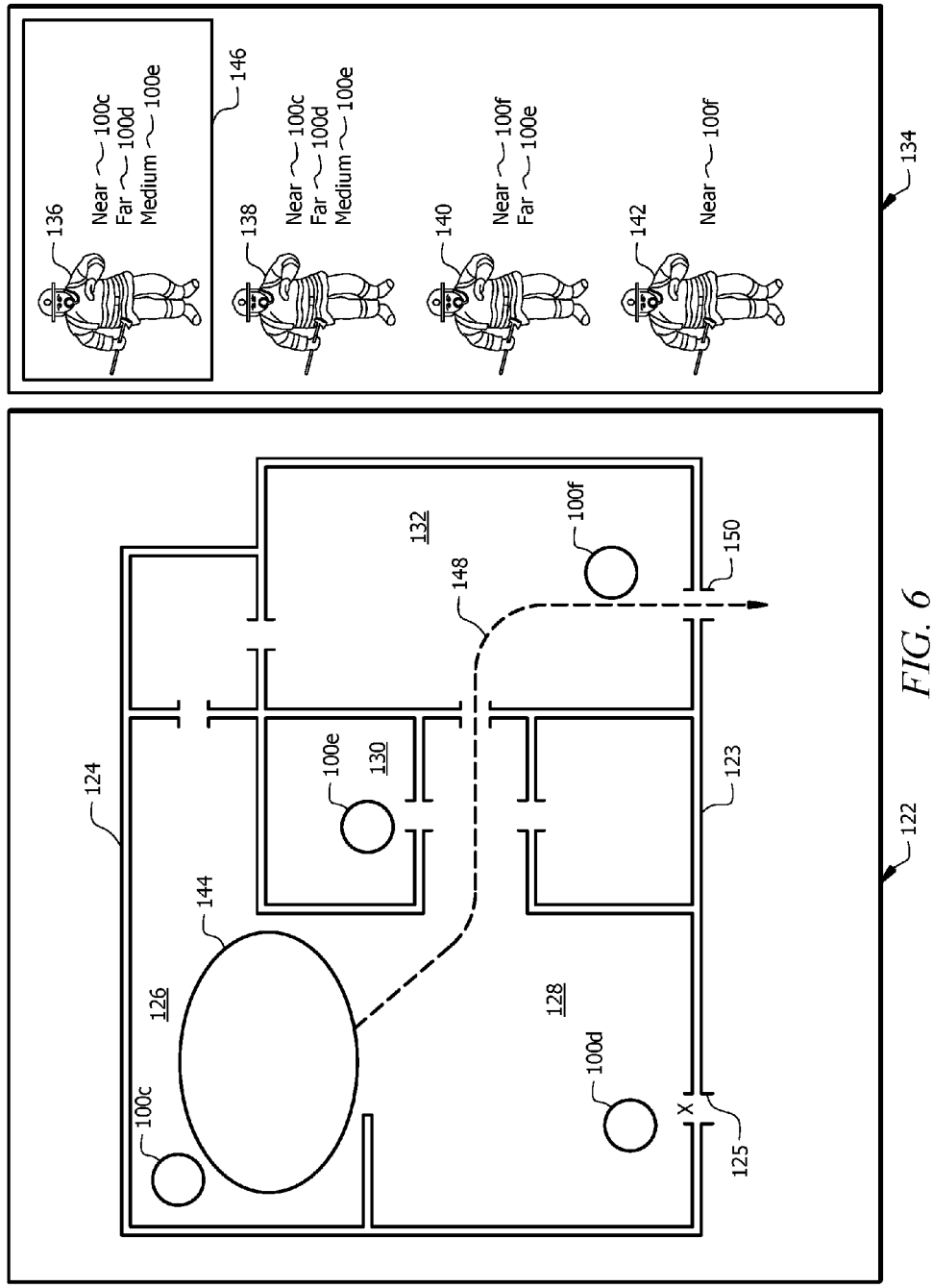
FIG. 6 is a schematic illustration of a user interface showing an exit route in accordance with embodiments of the disclosure.

FIG. 6 illustrates exit route 148 in user interface 122 based on the positions of the RF beacons 100c-100f. The incident commander 112 may draw an exit route 148 in user interface 122 for firefighters 136, 138, 140, and/or 142 within structure 123, and direct firefighters 136, 138, 140, and/or 142 to exit 150 based on signal strength between a portable device 116 of each of firefighters 136, 138, 140, 142, and the RF beacons 100c-100f. The incident commander 112 may also direct (e.g., via radio) each of the firefighters 136, 138, 140, and/or 142 to exit 150 based on the descriptions of the locations of each of the RF beacons 100c-100f. That is, as previously mentioned, each of the firefighters 136, 138, 140, and/or 142 may have communicated to incident commander 112, a description of the location of each of the RF beacons 100c-100f during activation and positioning of RF beacons 100c-100f. The positions can then be used to locate and direct the firefighters to a position such as an exit, or the location of a firefighter who is in trouble or is injured.

Having described various systems and methods, various embodiments can include, but are not limited to:

In a first embodiment, an emergency responder tracking system may comprise a beacon comprising a radio frequency module; a telemetry module, wherein the telemetry module is mounted on a self-contained breathing apparatus and is configured to receive a wireless signal from the beacon and transmit the wireless signal to a computer system, wherein the computer system comprises a user interface and is configured to receive the wireless signal from the telemetry module and provide a map, in the user interface, of a location of the beacon; wherein the wireless signal comprises a unique identifier, a location of the beacon, a last detected location of an emergency responder, and/or current time.

A second embodiment may include the emergency responder tracking system of the first embodiment, further comprising a radio frequency relay station configured to receive the wireless signal from the telemetry module and transmit the wireless signal to the computer system over a distance, wherein the distance is up to 20 miles.

A third embodiment may include the emergency responder tracking system of the first or second embodiment, wherein the beacon is waterproof and heat resistant up to about 600° F.

A fourth embodiment may include the emergency responder tracking system of any of the preceding embodiments, wherein the user interface is configured to allow identification and selection of personnel in a vicinity.

A fifth embodiment may include the emergency responder tracking system of any of the preceding embodiments, wherein the user interface is further configured to display markers tracking movement of the personnel.

A sixth embodiment may include the emergency responder tracking system of any of the preceding embodiments, wherein the user interface is configured to indicate the vicinity, with a circular graphic, of each of the personnel.

A seventh embodiment may include the emergency responder tracking system of any of the preceding embodiments, wherein a signal strength between the beacon and the telemetry module is configured to indicate a distance between the beacon and the self-contained breathing apparatus.

An eighth embodiment may include the emergency responder tracking system of any of the preceding embodiments, wherein the beacon is configured to be mounted to structures by screws, bolts, straps, adhesive, or combinations thereof.

A ninth embodiment may include the emergency responder tracking system of any of the preceding embodiments, wherein the beacon comprises a dial to activate the beacon.

A tenth embodiment may include the emergency responder tracking system of any of the preceding embodiments, wherein a wireless protocol for communication between the beacon and the telemetry module is BLUETOOTH low energy, low power wide area network, 802.15.4, or combinations thereof.

In an eleventh embodiment, a method for tracking an emergency responder may comprise attaching a plurality of beacons to a structure within a building, wherein each beacon comprises a radio frequency module; activating each beacon; communicating to a computer system a description of a placement of each beacon relative to surrounding structures; transmitting information from each beacon to a telemetry module, wherein the telemetry module is mounted on a self-contained breathing apparatus of an emergency responder; transmitting the information from the telemetry module to the computer system; drawing a floor plan, with the computer system, of the building based on the description; and displaying in the user interface, the floor plan and location of each beacon; wherein the information comprises a unique identifier, the location of each beacon, a last detected location of the emergency responder, and/or current time.

A twelfth embodiment may include the method of the eleventh embodiment, wherein the activating comprises turning a dial, wherein the dial is positioned on the beacon.

A thirteenth embodiment may include the method of the eleventh or twelfth embodiments, wherein the method may further comprise transmitting the information from the telemetry module to a radio frequency relay station.

A fourteenth embodiment may include the method of any one of the eleventh through thirteenth embodiments, wherein the method may further comprise transmitting the information from the radio frequency relay station to the computer system.

A fifteenth embodiment may include the method of any one of the eleventh through fourteenth embodiments, wherein the method may further comprise throwing an activated beacon into the building to locate a lost emergency responder.

A sixteenth embodiment may include the method of any one of the eleventh through fifteenth embodiments, wherein the method may further comprise indicating, with the user interface, a presence of the lost emergency responder based on signal strength between the activated beacon and a self-contained breathing apparatus mounted telemetry module of the lost emergency responder.

In a seventeenth embodiment, a method for directing an emergency responder may comprise attaching a plurality of beacons to a structure within a building, wherein each beacon comprises a radio frequency module; activating each beacon; communicating to a computer system a description of a placement of each beacon relative to surrounding structures; transmitting information from each beacon to a telemetry module, wherein the telemetry module is mounted on a self-contained breathing apparatus of an emergency responder; transmitting the information from the telemetry module to the computer system; drawing a floor plan, with the computer system, of the building based on the description; drawing an exit route for the building, with the computer system based on the description; displaying in the user interface, the floor plan, the exit route, and location of each beacon; and directing an emergency responder to the exit based on signal strength between each beacon and the telemetry module; wherein the information comprises a unique identifier, the location of each beacon, a last detected location of the emergency responder, and/or current time.

An eighteenth embodiment may include the method of the seventeenth embodiment, wherein the method may further comprise identifying the emergency responder in the user interface.

A nineteenth embodiment may include the method of the seventeenth embodiment or eighteenth embodiment, wherein the method may further comprise indicating, with the computer system, a vicinity of the emergency responder.

A twentieth embodiment may include the method of any one of the seventeenth through nineteenth embodiments, wherein the method may further comprise selecting, with the computer system, the emergency responder from a plurality of emergency responders to display, in the user interface, an estimated region of the emergency responder.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An emergency responder tracking system comprising:
a plurality of portable beacons comprising a radio frequency module having a first range for communication;
a portable device comprising a transceiver, wherein the portable device is configured to receive a wireless signal from a beacon of the plurality of beacons when within the first range and transmit the wireless signal to a computer system within a second range, wherein the portable device is mounted on a self-contained breathing apparatus of an emergency responder;
wherein the computer system comprises a user interface and is configured to:
receive the wireless signal from the portable device and determine a location of the beacon;
receive a description of a placement of each portable beacon of the plurality of portable beacons relative to a surrounding structure of a building;
draw a floor plan of the building based on the description;
draw an exit route for the building based on the description; and
display, in the user interface, the floor plan, the exit route, and location of each portable beacon of the plurality of portable beacons;
wherein the wireless signal comprises a unique identifier, the location of the beacon, a last detected location of an emergency responder, and/or current time;
wherein the second range is greater than the first range;
wherein the plurality of portable beacons is configured for attachment to a structure within the building.

2. The emergency responder tracking system of claim 1, further comprising a radio frequency relay station configured to receive the wireless signal from the portable device and transmit the wireless signal to the computer system over a distance of up to 20 miles.

3. The emergency responder tracking system of claim 1, wherein the beacon is waterproof and heat resistant up to about 600° F.

4. The emergency responder tracking system of claim 1, wherein the computer system is configured to allow identification of at least one emergency responder within a predetermined vicinity of the building.

5. The emergency responder tracking system of claim 1, wherein the computer system comprises the user interface, and wherein the user interface is configured to display markers tracking movement of at least one emergency responder.

6. The emergency responder tracking system of claim 5, wherein the user interface is configured to indicate a predetermined vicinity, with a circular graphic, of the at least one emergency responder.

7. The emergency responder tracking system of claim 1, wherein the computer system is configured to use a signal strength between the beacon and the portable device to determine a distance between the beacon and the portable device.

8. The emergency responder tracking system of claim 1, wherein the beacon is configured to be mounted to structures by screws, bolts, straps, adhesive, or combinations thereof.

9. The emergency responder tracking system of claim 1, wherein the beacon comprises a dial to activate the beacon.

10. The emergency responder tracking system of claim 1, wherein a wireless protocol for communication between the beacon and the portable device is BLUETOOTH low energy, low power wide area network, 802.15.4, or combinations thereof.

11. A method for tracking an emergency responder comprising:
during an active incident, attaching a plurality of portable beacons within a building at a plurality of locations, wherein each beacon of the plurality of portable beacons comprises a radio frequency module having a first range for communication;
activating each beacon;
communicating to a computer system a description of a placement of each beacon;
detecting one or more portable devices that are moving within the building, wherein at least one of the one or more portable devices is mounted on a self-contained breathing apparatus that is associated with an emergency responder of a plurality of emergency responders, wherein each of the one or more portable devices has a second range for communication, and wherein each of the one or more portable devices is mounted on a self-contained breathing apparatus of one or more emergency responders;
transmitting information from each beacon to the one or more portable devices within the first range;
transmitting the information from the one or more portable devices to the computer system within the second range;
drawing a floor plan, by the computer system, of the building based on the description;
drawing an exit route for the building, by the computer system, based on the description;
displaying in a user interface, the floor plan, the exit route, and locations of each beacon;
tracking a location of the one or more portable devices based on the information transmitted from the one or more portable devices to the computer system;
wherein the second range is greater than the first range.

12. The method of claim 11, further comprising:
setting, with a dial, an address of a location of a beacon of the plurality of portable beacons, wherein the dial is positioned on the beacon;
wherein the information comprises a unique identifier, the location of the beacon, a last detected location of one of the plurality of emergency responders, and/or current time.

13. The method of claim 11, wherein the activating comprises turning a dial, wherein the dial is positioned on the beacon;
wherein the attaching and activating the plurality of portable beacons is performed by a first emergency responder;
wherein the moving one or more portable devices is performed by one or more subsequent emergency responders moving within the building.

14. The method of claim 12, further comprising:
transmitting the information from the one or more portable devices to a radio frequency relay station.

15. The method of claim 11, further comprising throwing an activated beacon into the building to locate a lost emergency responder.

16. The method of claim 15, further comprising indicating, with the user interface, a presence of the lost emergency responder based on a signal strength between the activated beacon and a self-contained breathing apparatus mounted portable device of the lost emergency responder.

17. A method for directing an emergency responder comprising:
during an active incident, attaching a plurality of portable beacons within a building at a plurality of locations, wherein each beacon of the plurality of portable beacons comprises a radio frequency module having a first range for communication;

activating each beacon;

communicating to a computer system a description of a placement of each beacon relative to surrounding structures of the building;

detecting one or more portable devices that are moving within the building, wherein each of the one or more portable devices is associated with a different emergency responder of a plurality of emergency responders and has a second range for communication;

transmitting information from each beacon to the one or more portable devices within the first range, wherein at least one of the one or more portable devices is mounted on a self-contained breathing apparatus that is associated with an emergency responder of the plurality of emergency responders;

transmitting the information from the one or more portable devices to the computer system;

drawing a floor plan, by the computer system, of the building based on the description;

drawing an exit route for the building, by the computer system, based on the description;

displaying in a user interface, the floor plan, the exit route, and location of each beacon; and directing at least one emergency responder from the plurality of emergency responders to the exit route based on a signal strength between each beacon and a portable device associated with the at least one emergency responder;

wherein the information, transmitted from each beacon, comprises a unique identifier, a location of a beacon from the plurality of portable beacons, a last detected location of one of the plurality of emergency responders, and/or current time;

wherein the second range is greater than the first range.

18. The method of claim 17, further comprising identifying the at least one emergency responder in the user interface.

19. The method of claim 17, further comprising indicating, by the computer system, a vicinity of the at least one emergency responder.

20. The method of claim 17, further comprising selecting, by the computer system, the at least one emergency responder from the plurality of emergency responders to display, in the user interface, an estimated region of the at least one emergency responder.

\* \* \* \* \*